R. E. KERLIN.
MOTOR DRIVEN VEHICLE.
APPLICATION FILED OCT. 15, 1920.

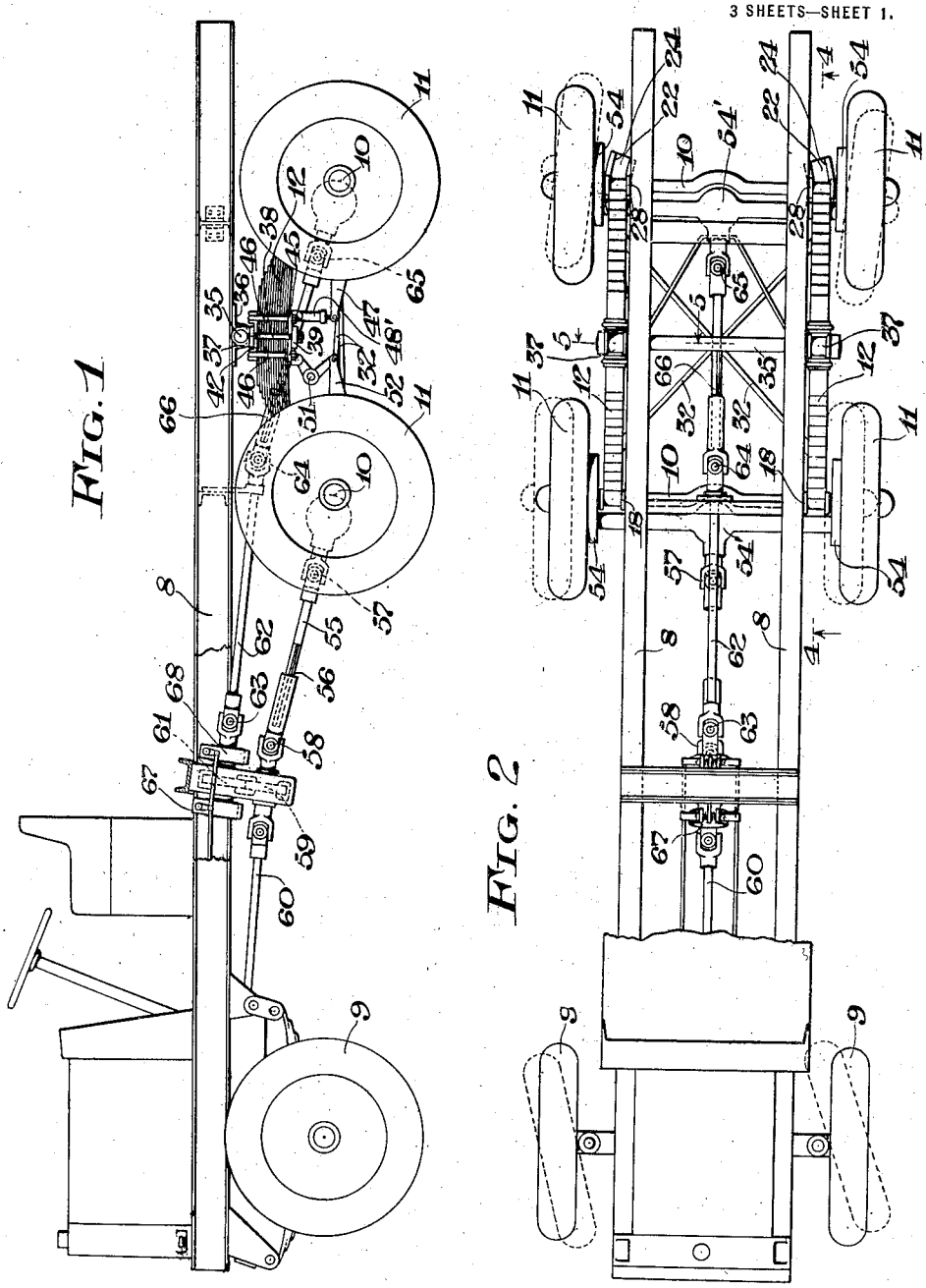

1,391,834.

Patented Sept. 27, 1921.
3 SHEETS—SHEET 2.

WITNESSES
H. D. Chase

INVENTOR
Rudolph E. Kerlin
By R. S. Caldwell
ATTORNEY

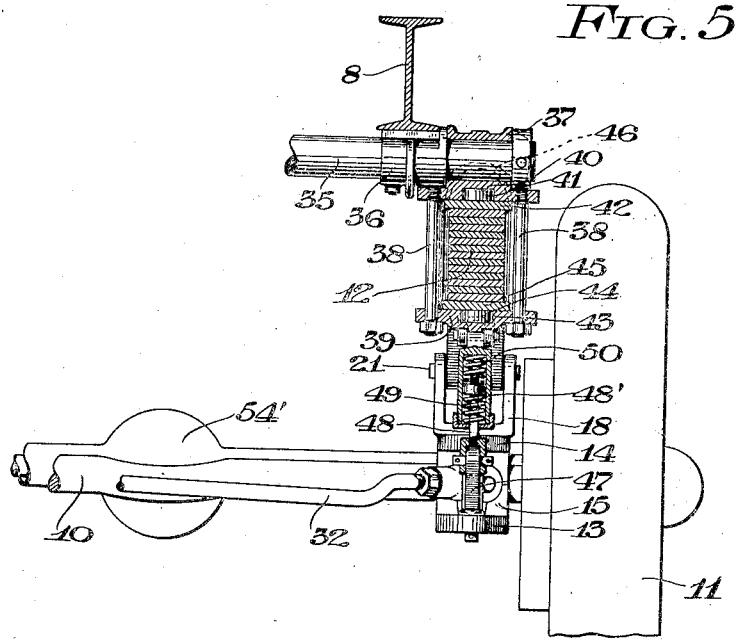

UNITED STATES PATENT OFFICE.

RUDOLPH E. KERLIN, OF CUDAHY, WISCONSIN.

MOTOR-DRIVEN VEHICLE.

1,391,834.  Specification of Letters Patent.  Patented Sept. 27, 1921.

Application filed October 15, 1920. Serial No. 417,113.

*To all whom it may concern:*

Be it known that I, RUDOLPH E. KERLIN, a citizen of the United States, and resident of Cudahy, county of Milwaukee, and State of Wisconsin, have invented new and useful Improvements in Motor-Driven Vehicles, of which the following is a description, reference being had to the accompanying drawings, which are a part of this specification.

The invention relates to motor-driven vehicles.

One of the objects of the invention is to provide a four-wheel rear supporting structure for a motor-driven vehicle whereby the load carrying capacity over the usual two-wheel rear supporting structure is increased and whereby it is possible to use the same size tires at the rear as are employed on the front wheels of the vehicle.

A further object of the invention is to provide a four-wheel rear supporting structure for a motor-driven vehicle with a drive to all rear wheels to increase the tractive power of the vehicle.

A further object of the invention is to provide a four-wheel rear supporting and driving structure for a vehicle in which the wheels are mounted on a pair of axles relatively movable with respect to each other to provide for steering the vehicle.

A further object of the invention is to provide a four-wheel rear supporting structure for the vehicle in which the axles supporting the wheels are automatically moved when the vehicle is turned so that the rear wheels will track with the front wheels.

The invention further consists in the several features hereinafter set forth and more particularly defined by claims at the conclusion hereof.

Figure 3:
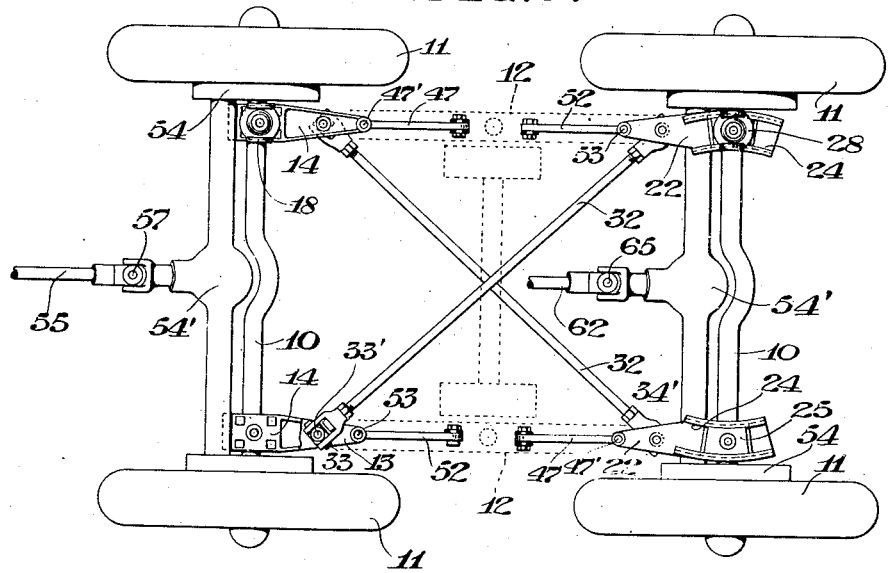
Figure 4:
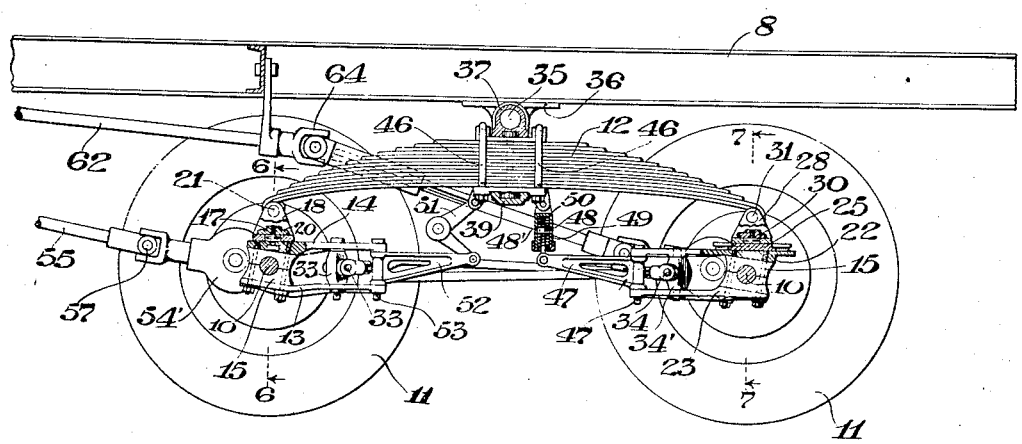

In the drawings: Figure 1 is an elevation view of a vehicle embodying the invention; Fig. 2 is a plan view thereof; Fig. 3 is a plan view of the rear wheel-truck; Fig. 4 is a section taken on the line 4—4 of Fig. 2; Fig. 5 is a detail sectional view taken on the line 5—5 of Fig. 2; Fig. 6 is a section taken on the line 6—6 of Fig. 4; Fig. 7 is a section taken on the line 7—7 of Fig. 4.

In the drawings, the numeral 8 designates the frame of the vehicle which is supported in front by the front wheels 9 in a well-known manner. The wheels 9 may be used only for steering, as shown, or they may be driven in a manner well known in this art where a live axle is used having universal joint driving connections to said wheels.

The rear of the vehicle is supported upon a truck construction embodying a pair of wheeled trucks each having an axle 10 and wheels 11, said trucks being connected together by load-transmitting springs 12 which are connected to the frame 8 of the vehicle, as hereinafter described.

The front wheeled truck has arms 13 and 14 connected to each end portion or pad 15 for its axle 10. Each arm 14 has a cylindrical boss 16 and a bolt 17 is seated in said arm and passes through the center of said boss. A U-shaped spring hanger or bracket 18 has an opening 19 to receive said boss and is free to turn on said boss, a nut 20 being mounted on the bolt 17 to hold the bracket 18 in operative position. The forward ends of the springs 12 are connected by spring bolts 21 to the arms of the brackets 18. This construction permits a turning of the springs 12 with respect to the axle 10 for this truck.

The rear wheeled truck has arms 22 and 23 connected to each end portion or pad 15 for its axle 10. Each arm 22 has an arcuate guideway 24 formed therein receiving an arcuate sliding block 25. Each block 25 has a cylindrical boss 26 and a bolt 27 is seated in said block and passes through the center of said boss. A U-shaped spring hanger or bracket 28 has an opening 29 to receive said boss and is free to turn on said boss, a nut 30 being mounted on the bolt 27 to hold the bracket 28 in operative position. The rear ends of the springs 12 are connected by spring bolts 31 to the arms of the brackets 28. This construction permits a turning of the springs 12 with respect to the axle 10 for this truck and also a sliding movement.

Cross rods 32 are vertically pivotally connected at their forward ends by bolts 33 to vertical spindles 33' journaled in each set of arms 13 and 14 of the forward wheeled truck and by bolts 34 to vertical spindles 34' journaled in each set of arms 22 and 23 of the rear wheeled truck. Thus each of the rods 32 is connected to one set of arms on one side of the front axle and to one set of arms on the opposite side of the rear axle. The result of this construction is a turning of the rear axle on a lateral movement of the front axle and the sliding of the blocks 25 in the guideways 24 to permit this turning movement. Furthermore, these rods act as tie rods for the axles.

A shaft 35 is preferably journaled in brackets 36 on the frame 8 and has bearing blocks 37 keyed thereto at its ends. Each block 37 is connected by bolts 38 to a bearing block 39. Each block 37 has a cylindrical recess 40 receiving a cylindrical pivot boss 41 on a spring clamping plate 42 and each block 39 has a cylindrical recess 43 receiving a cylindrical pivot boss 44 on a spring clamping plate 45. The plates 42 and 45 are clamped to the central portions of the suspension springs 12 by means of U-bolts 46 and the bosses 41 and 44 for each set of spring clamps being in line with each other the springs 12 are permitted to have a limited turning movement in a horizontal plane with respect to the shaft 35 and consequently the frame 8.

As the shaft 35 is capable of vertical swinging with respect to the frame 8, both wheeled trucks may swing with the springs 12 if the wheels encounter obstacles in the road.

In order to check the torque or the tendency of the whole truck turning, an arm 47 is pivotally connected to each truck, one arm 47 being connected by a bolt 47' to one set of arms 22 and 23 and the other arm similarly connected to one set of arms 13 and 14, and a connection is made between each arm 47 and the adjacent spring 12. In each instance this connection includes a plunger 48 pivotally connected to the end of the arm 47 and mounted in a casing 48' between springs 49 and 50 inclosed therein, said casing being pivotally connected to the bearing block 39 adjacent thereto.

In order to check the rebound of spring 12 arms 51 are connected to the blocks 39 and to arms 52. One arm 52 is pivotally connected by a bolt 53 to one set of arms 13 and 14 and the other arm similarly connected to one set of arms 22 and 23.

Either one or both of the wheel sets for the rear supporting truck structure may be driven though if one set is driven it is preferred to drive those forming the forward wheeled truck. In the present instance I have shown an internal gear drive construction 54 to each of the wheeled trucks, including differentials 54', though a worm gear drive may also be used if desired. The propelling shaft 55 for the front truck includes a telescoping connection 56 and universal joints 57 and 58 and connects with a gear 59 and a propelling shaft 60 operatively connected with the drive shaft of the engine. The gear 59 meshes with a gear 61 on a propelling shaft 62 for the rear truck including universal joints 63, 64 and 65 and a telescoping connection 66. Suitable means are provided for stopping the drive to the rear trucks, such as a service brake 67 and an emergency brake 68, under control of the operator, whereby the stopping of the drive gear 61 necessarily stops the drive of gear 59 and the shafts connected to these gears. The universal joints and the telescopic connections of the propelling shafts permit of the drive of the trucks in the different positions they may assume under running conditions.

That portion of the springs 12 between their point of connection with the ends of the shaft 35 and consequently the frame and with the front axle 10 forms links of equal length connecting said axle with the frame and forming a parallelogram linkage. Consequently, when the front wheels 9 are turned the frame 8 shifts relative to the front axle 10 with the wheels carried by said front axle 10 remaining parallel with the frame. This relative lateral movement of the front axle 10 and frame is transmitted through the springs 12 to the rear axle and together with the rods 32 and arms 22 which have sliding connection with the springs 12, cause the turning of the rear axle 10 and the movement of its wheels in an opposite direction from that of the front wheels 9, as shown in dotted lines in Fig. 2. When the wheels 9 are again brought to a position parallel with the frame the front wheels 11 of the rear truck construction move back into alinement with the front wheels 9 and the back wheels 11 of the rear truck construction swing back and line up with the front wheels. Thus the relative movement of the front wheels of the rear truck with respect to the frame causes a movement of the back wheels of the rear truck in the proper direction and this relative movement of the front wheels of the rear truck is accomplished by a shifting of the frame 8 under the control of the front wheels 9. The springs 12 transmit the load to both rear axles and the axles for each set of wheels may move up and down with the wheels and both axles may swing about the shaft 35 so that a very flexible rear truck construction is produced which facilitates the passage of the vehicle over obstacles that may be encountered in its path.

In accordance with the provisions of the patent statutes I have described the principle of operation of my invention together with the device which I now consider to represent the best embodiment thereof; but I desire to have it understood that the device shown is only illustrative and that the invention can be carried out by other means within the scope of my claims.

What I claim as my invention is:

1. In a vehicle, the combination with the vehicle frame, of a wheeled structure supporting said frame comprising a front wheeled truck having a free lateral movement and a rear wheeled truck having a swinging movement relative to said frame, supporting springs operatively connected to said wheeled trucks and to said frame, and a connection between said wheeled trucks controlling the swinging movement of the rear truck on the lateral movement of the front truck.

2. In a motor-driven vehicle, the combination, with the vehicle frame and front wheels, of a wheeled structure supporting the rear portion of said frame comprising a laterally movable front wheel truck and a swinging rear wheeled truck, supporting springs pivotally connected intermediate their ends to said frame, pivotally connected at their forward ends to the front wheeled truck and pivotally and slidably connected at their rear ends to the rear wheeled truck, a connection between said trucks controlling their relative movement with respect to each other, and means for driving one of said trucks.

3. In a motor-driven vehicle, the combination, with the vehicle frame and front wheels, of a wheeled structure supporting the rear portion of said frame comprising a laterally movable front wheeled truck and a swinging rear wheeled truck, supporting springs connected to said frame intermediate their ends for vertical and lateral swinging movement with respect thereto, pivotally connected at their front ends to the front truck and pivotally and slidably connected at their rear ends to the rear truck, means connecting said trucks together and controlling their relative movement with respect to each other, and means for driving one of said trucks.

4. In a motor-driven vehicle, the combination with the vehicle frame and front wheels, of a pair of springs connected intermediate their ends to the rear portion of said frame, a front wheeled truck, spring-connecting brackets for the front ends of said springs pivotally mounted on said front truck, a rear wheeled truck having arcuate guideways, blocks slidably mounted in said guideways, spring-connecting brackets for the rear ends of said springs pivotally mounted on said blocks, crossed members pivotally connected at their ends to opposite end portions of the front and rear trucks, and means for driving the wheels of one of said trucks.

5. In a motor-driven vehicle, the combination with the vehicle frame and front wheels, of a pair of springs connected intermediate their ends to the rear portion of said frame for vertical and lateral movement with respect thereto, a front wheeled truck, spring-connecting brackets for the front ends of said springs pivotally mounted on said front truck, a rear wheeled truck having arcuate guideways, blocks slidably mounted in said guideways, spring-connecting brackets for the rear ends of said springs pivotally mounted on said blocks, crossed members pivotally connected at their ends to opposite ends portions of the front and rear trucks, and means for driving the wheels of one of said trucks.

6. In a vehicle, the combination with the vehicle frame, of a wheeled structure comprising a laterally movable front wheeled truck, a swinging rear wheeled truck, means connecting said front truck to the frame for lateral movement of said front truck with respect to said frame by the movement of the frame, and means connecting said front truck to said rear truck controlling the swinging movement of said rear truck on a lateral movement of the front truck.

7. A truck construction for vehicles comprising a laterally movable front wheeled truck, a swinging rear wheeled truck, supporting springs pivotally connected intermediate their ends to the vehicle frame, pivotally connected at their forward ends to the front wheeled truck and pivotally and slidably connected at their rear ends to the rear wheeled truck, and links connecting diagonally opposite ends of said trucks together.

8. A truck construction for vehicles comprising a laterally movable front wheeled truck, a swinging rear wheeled truck, supporting springs pivotally connected intermediate their ends to the vehicle frame, pivotally connected at their forward ends to the front wheeled truck, and pivotally and slidably connected at their rear ends to the rear wheeled truck, and means connecting the trucks together to control their relative movement with respect to each other.

9. A truck construction for vehicles comprising a laterally movable front wheeled truck, a swinging rear wheeled truck having arcuate guideways, blocks slidably mounted in said guideways, means operatively connecting said blocks and front truck, and crossed members pivotally connected at their ends to opposite end portions of the front and rear trucks.

10. A truck construction for vehicles comprising a laterally movable front wheeled truck, a swinging rear wheeled truck having arcuate guideways, means connecting said trucks together to control their relative movement with respect to each other, blocks slidably mounted in said guideways, and means operatively connecting said blocks with the front truck.

In testimony whereof I affix my signature.

RUDOLPH E. KERLIN.